April 19, 1960
C. R. BAECHTEL
2,933,164
FLEXIBLE BRAKE SHOE ASSEMBLY
Filed Dec. 14, 1956
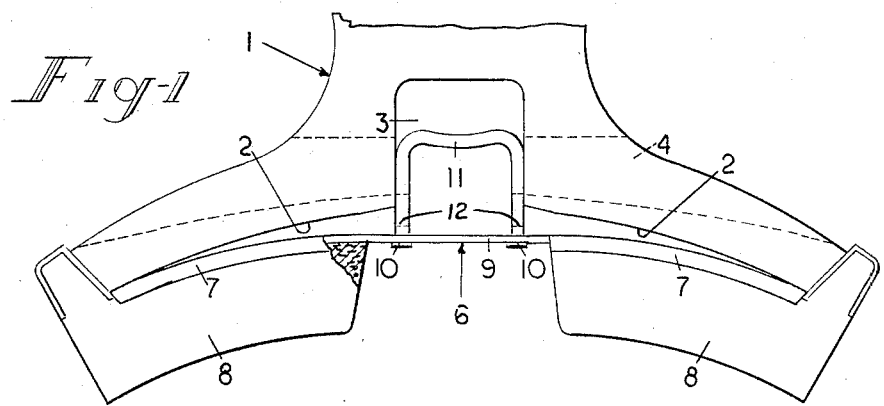
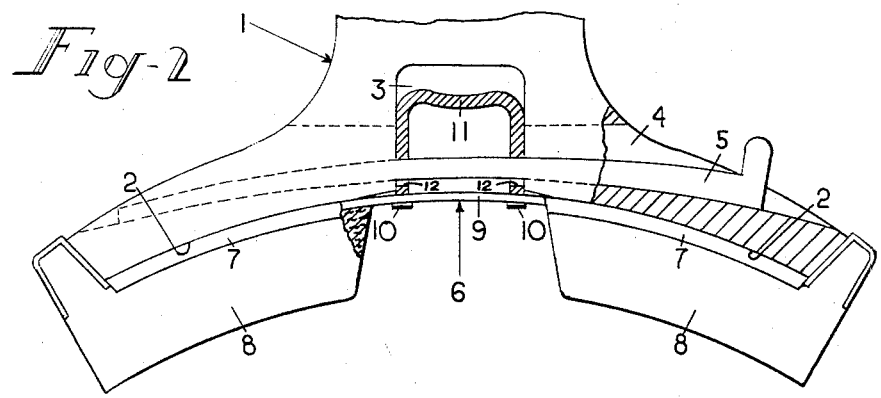
INVENTOR.
Clarence R. Baechtel
BY
Adelbert A. Steinmiller
Attorney

United States Patent Office 2,933,164
Patented Apr. 19, 1960

2,933,164
FLEXIBLE BRAKE SHOE ASSEMBLY

Clarence R. Baechtel, Lakewood, Ohio, assignor to Westinghouse Air Brake Company, Wilmerding, Pa., a corporation of Pennsylvania Application December 14, 1956, Serial No. 628,410

2 Claims. (Cl. 188—243)

This invention relates to a brake shoe assemblage and more particularly to a brake shoe assemblage for railway vehicles.

In brake equipment for braking engagement with the tread of a railway vehicle wheel it is common practice to employ a brake shoe having an arcuate braking surface for frictional engagement with such tread and a backing surface of corresponding shape which is intended to be supported by corresponding arcuate thrust surfaces formed in a brake head which carries such shoe. It is also common practice to lock such shoe to the brake head by means of a tapered key which extends through aligned openings in a key lug projecting centrally from the backing face of the shoe body into a recess formed in the brake head. During use on a railway vehicle the brake shoe thus attached to a brake head is subjected to considerable vibration and jarring which tends to cause shifting of the key and consequent loosening of the brake shoe with respect to the brake head. Such loosening permits limited degrees of relative movement between the brake shoe body and the brake head, with consequent wear of the arcuate thrust surfaces of such brake head. Eventually, due to such wear, the arcuate thrust surfaces of the brake head will not correspond in radius or shape with the backing surface of a new shoe which may be introduced to such brake head, so that the curvature of the brake head will not correspond to the curvature of the backing surface of such new shoe and support of such backing surface by the head will not be complete but perhaps only adjacent its opposite ends, for example. If such brake shoe be of the type employing a friction body of composition material having the usual metal backing plate of relatively thin construction, it will be apparent that, with support of said backing plate or element only at one or two points such as adjacent its opposite ends only, upon the effecting of frictional engagement of such a brake shoe with a wheel tread for deliverance of a braking force through the medium of the brake head, bending of the backing plate with consequent cracking of the composition body material is encouraged. This action results in slough-off and loss of such body material, with considerable reduction in service life of such a brake shoe.

In view of the foregoing remarks, it becomes a prime object of the present invention to provide a brake shoe assemblage particularly adapted for use with a friction body composed of composition material which may be secured to the standard brake head by the usual tapered key in substantially complete support by its thrust faces irrespective of a change in curvature of such faces which may have occurred due to wear, and without experiencing the usual vibration relative to said brake head during its use.

Other objects and advantages of the invention will become apparent from the following more detailed description of the invention when taken in connection with the accompanying drawing in which:

Fig. 1 is a side elevation view partly in section and partly in outline of a brake shoe assemblage embodying the invention as same is associated with a standard brake head immediately prior to insertion of the usual tapered locking key; and Fig. 2 is a similar view of the novel brake shoe assemblage after same has been secured in a novel manner by the usual tapered locking key to a brake head.

Referring to the drawings wherein like numerals of reference designate corresponding parts throughout the several views, the novel brake shoe assemblage is intended to be employed with the usual brake head 1 having arcuate thrust surfaces 2 extending in opposite directions from a central key-lug-accommodating recess 3. The arcuate thrust surfaces 2, insofar as the present invention is concerned, may either be continuous as shown in the drawing, or in keeping with other well-known brake head constructions, such arcuate thrust surfaces 2 may be interrupted at intervals, without depreciating the utility of applicant's novel brake shoe assemblage. The brake head 1 in one form or another will comprise the usual slot or opening 4 extending in the general direction of extension of the arcuate thrust surfaces 2 into transverse intersection with the recess 3, to accommodate the usual key 5 in the well-known manner as shown in Fig. 2.

According to the invention, the novel brake shoe assemblage comprises a backing plate 6 having rigid arcuate sections 7 to which are attached by suitable means (not shown) a plurality of arcuate friction elements or brake blocks 8 which may be composed of composition material having an inner surface conforming to the curvature of the vehicle wheel tread. According to a prime feature of the invention, such backing plate 6 is provided with a flexible leaf spring section 9, preferably composed of spring steel, which is interposed between and attached to the rigid arcuate sections 7 of such backing plate, such as by integral connection therewith. The flexible section 9 is free of attachment with the friction elements 8 and preferably is of such length as will at least span the width of the key-lug-accommodating recess 3 in the brake head. Suitably attached to the flexible section 9 of the novel backing plate 6, such as by means of tongues 10 extending through slots formed in the flexible section as shown on the drawing, is a key lug 11 of any well-known suitable configuration having the usual aligned openings 12 for accommodating the usual tapered key 5.

Prior to securing the novel brake shoe assemblage to the brake head 1, the flexible section 9 of the backing plate 6 will be in its relaxed state in which the rigid arcuate sections 7 depending therefrom are positioned relative thereto such that upon introducing the key lug 11 of the shoe assemblage into the recess 3 in the braking head 1, such backing plate initially will contact the thrust surfaces 2 of such head only at opposite ends of the brake shoe assemblage, while considerable clearance between such thrust surfaces and the backing plate 6 will exist in the vicinity of the open end of such recess, as shown in Fig. 1. While such brake shoe assemblage is held disposed in above-described contact with the brake head 1, the narrow tapered end of the key 5 will be inserted through one end of the opening 4 in the brake head 1 and through the aligned openings 12 in the key lug 11 of the brake shoe assemblage. Insertive force will then be applied to cause flexure of section 9 and drawing of key lug 11 into the recess 3. Such movement of the key lug 11 into the recess 3 will continue with progressive insertion of the key 5 until the resultant flexure of the section 9 permits the rigid arcuate sections 7 of the backing plate 6 to be brought into substantially overall contact with the arcute thrust surfaces 2 of the brake head 1. The concave surface of the brake head 1 may be offset or curved inwardly of such surface in the vicinity of recess 3 to provide additional clearance, if necessary, for the desired flexure of backing plate section 9 to permit both rigid sections 7 to be brought into proper contact with the thrust surfaces 2. At such time, securing of the novel brake shoe assemblage to a brake head 1 is completed.

In keeping with the principal object of the invention, it will be apparent from the foregoing description in connection with the securing of the novel brake shoe assemblage to a brake head, that, by virtue of the flexure of the resilient section 9, the friction body portions of such assemblage will assume and be maintained in substantially continuous support by the head 1 irrespective of the usual alteration in curvature of its thrust surfaces during prior use. Furthermore, during use of the subject brake shoe assemblage on a railway vehicle, it will be apparent that the caged-spring-like action of the flexible portion 9, in tending to urge the upper edges of the openings 12 in the key lug 11 of such brake shoe assemblage into tight frictional engagement with the key 5, will also tend to maintain the brake shoe assemblage tightly secured to the brake head even when subjected to severe shock and vibration characteristics of such use on railway vehicles. This effective and continued locking of the shoe assemblage to the brake head prevents relative movement between the assemblage and head and thus eliminates further wear of the thrust surfaces 2. At the same time, by virture of having been afforded substantially continuous support of the portions 7 bearing the friction elements 8, it will be apparent that bending of these portions 7 and cracking of the friction elements 8 due to bending during frictional engagement with the railway wheel will be eliminated. The life of such a brake shoe assemblege thus will be lengthened because loss of material from the brake shoe due to cracking will not occur.

Having now described the invention, what I claim as new and desire to secure by Letters Patent, is:

1. For use with a brake head of the type having spaced concave surfaces of uniform curvature separated by a recess extending inwardly from said concave surfaces, and a key-accommodating opening intersecting said recess, a brake shoe comprising the combination of a backing plate having a pair of spaced-apart rigid arcuate sections adapted to lie on opposite sides of said recess and having a curvature conforming to the curvature of the concave surfaces on the brake head, separate brake blocks attached to each of the rigid arcuate sections, each block having a concave braking surface for contacting the tread surface of a wheel to be braked, said braking surfaces having a curvature conforming to the curvature of the tread surface of the wheel to be braked, a flexible straight leaf spring section integrally joining said rigid arcuate sections and adapted to span the recess in the brake head, said leaf spring section in its free unflexed state biasing said rigid arcuate sections to a position such that the concave braking surfaces of said brake blocks are out of concentricity with the curvature of the tread surface of the wheel to be braked, a key lug attached to said leaf spring section and projecting into the recess in the brake head and adapted to be secured by a key extending through the key-accommodating opening in a manner to flex said leaf spring section and cause said concave braking surfaces on said brake blocks to be brought into concentricity with the curvature of the tread surface of the wheel to be braked.

2. In combination, a brake head having spaced concave surfaces of uniform curvature separated by a recess extending inwardly from said concave surfaces and a U-shaped key-accommodating opening intersecting said recess; and a brake shoe comprising a backing plate having a spaced-apart rigid arcuate sections one at each side of said recess and each having a convex face conforming to the curvature of the concave surfaces on said brake head, separate arcuate brake blocks attached to each of said rigid arcuate sections, a flexible straight leaf spring section spanning said recess in chordal relationship to said concave surfaces and joining said rigid arcuate sections, said leaf spring section in its free unflexed state biasing the rigid arcuate sections of said backing plate away from said concave surfaces such that only the outer ends of said rigid arcuate sections engage the outer ends of the concave surfaces on said brake head, a U-shaped key lug attached to said leaf spring section and projecting into said recess, and a key extending through said key-accommodating opening in cooperation with said key lug to flex said leaf spring section and cause said rigid arcuate sections to be biased into over-all contact with the concave surfaces on said brake head with a constantly effective force corresponding to the degree of tension developed in the flexed backing plate leaf spring section.

References Cited in the file of this patent

UNITED STATES PATENTS

| | | |
|---|---|---|
| 858,493 | Weston | July 2, 1907 |
| 887,243 | Gallagher | May 12, 1908 |
| 1,022,397 | Armbrust | Apr. 9, 1912 |
| 1,882,959 | Sargent | Oct. 18, 1932 |
| 1,893,306 | Sargent | Jan. 3, 1933 |
| 1,914,230 | Armbrust | June 13, 1933 |

FOREIGN PATENTS

| | | |
|---|---|---|
| 11,622 | Great Britain | May 21, 1903 |